Sept. 14, 1937.  F. G. TABORSKY  2,093,103
TESTING APPARATUS
Filed April 13, 1932
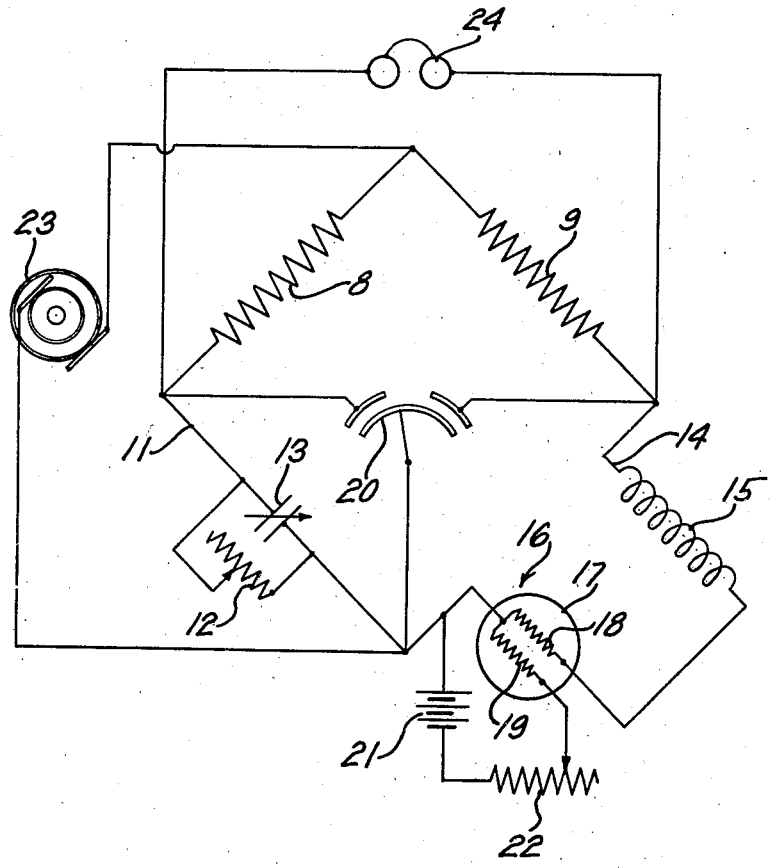
Inventor
F. G. Taborsky
By H. A. Whitehorn Att'y Patented Sept. 14, 1937

2,093,103

UNITED STATES PATENT OFFICE 2,093,103

TESTING APPARATUS

Frank G. Taborsky, Bellwood, Ill., assignor to Western Electric Company, Incorporated, New York, N. Y., a corporation of New York Application April 13, 1932, Serial No. 604,929

6 Claims. (Cl. 175—183)

This invention relates to a testing apparatus and more particularly to a thermally controlled resistance device embodied in said apparatus.

In the testing of reactive electrical units to determine their phase angle, a Wheatstone bridge is used in some instances in which means are provided to balance both the resistive and reactive components of the unit under test and the determinations are made from the setting of the balancing means. It is, therefore, important that the setting or adjustment of the resistance balancing means shall not disturb or introduce error into the reactance balancing means.

An object of the invention is to provide an effective and efficient testing apparatus having a variable resistance element of substantially constant reactance.

In accordance with one embodiment of the invention, a bridge circuit is provided having a thermally controlled resistance element enclosed in an evacuated bulb with means exterior of the bulb for varying the resistance of the resistance element.

It is believed that a complete understanding of the invention may be had by reference to the following description taken in conjunction with the accompanying drawing, in which the single figure is a diagrammatic view of an apparatus embodying the invention.

Referring now more in detail to the drawing, a Wheatstone bridge is shown having resistance elements 8 and 9 in complementary arms of the bridge. An arm 11 includes a variable resistance 12 and a variable condenser 13. Arm 14 of the bridge is adapted to receive a coil 15, whose phase angle is to be determined, and this arm also includes a variable resistance device 16, which comprises an evacuated bulb 17 having a resistance element 18 therein. This resistance element has a temperature coefficient of resistance so that the resistance of the element will vary in response to temperature changes of the element. The resistance element 18 is preferably of filamentary form. Also included within the bulb is an incandescent heater element 19, which is located in position relative to the resistance element 18 so that the heat of radiation from the heater element will impinge upon the resistance element. In view of the fact that both of the elements 18 and 19 are enclosed within an evacuated bulb, practically all the heat from element 19 will be transferred to the resistance element by radiation and very little by conduction or convexion, making it possible to control the temperature of element 18 within very close limits so that the resistance may be varied in infinitesimal increments. It has been found that due to the fact that the elongation of resistance element 18 does not vary appreciably with considerable changes in its resistance, the reactance of this element will be substantially constant. The heater element 19 is included in a circuit having a source of energy 21 and a variable resistance 22 for controlling the temperature of the heater element 19.

In order to energize the bridge circuit, a source of audible alternating current frequency 23 and an indicator 24, such as a receiver or head set, is provided to indicate when the bridge is balanced. In operating the apparatus, the bridge is first balanced with a standard coil of known resistance and known phase angle and the setting or adjustment of condensers 13 and 20 is noted. A coil 15 to be tested is then inserted in the bridge circuit and the bridge is balanced by adjusting resistance device 16, and condensers 13 and 20, and the phase angle of the coil is determined by the setting or adjustment of condensers 13 and 20.

The resistance 12 is not adjusted after the coil to be tested is inserted in the bridge since this would introduce an unknown reactive component into the circuit. The resistance adjustment is obtained by adjusting only the resistance device 16. It is evident that in order to avoid error in the final determination, the resistance device 16 should be adjusted without introducing a reactive component into the circuit and at the same time it should be adjustable in very small increments. The resistance device 16 accomplishes this result very satisfactorily due to the fact that the resistance may be changed in any desired small increment and the configuration of the resistance element 18 is not appreciably changed when the resistance thereof is changed, making it possible to obtain an extremely accurate determination of the phase angle of the coil being tested.

It will be understood that the nature and embodiment of the invention herein described and illustrated is merely illustrative of the invention and that many changes and modifications may be made therein without departing from the spirit and scope of the invention.

What is claimed is:

1. In a bridge circuit, an arm having an impedance element therein, a second arm having an impedance element to be measured, a resistance element in one of said arms having a temperature coefficient of resistance to balance the resistive components of the impedance elements, and manually controlled means for varying the temperature of said resistance element.

2. In a bridge circuit, a pair of electrically balanced arms, an arm having a variable standard impedance element therein, an arm having an impedance element to be measured therein, a resistance element in one of said impedance arms having a temperature coefficient of resistance, and manually controlled means for varying the temperature of the resistance element to adjust its resistance.

3. In a testing apparatus for determining the phase angle of an impedance device, means for balancing out the resistive component of the impedance device comprising a resistance element having a temperature coefficient of resistance, manually controlled means for varying the temperature of the resistance element, and means for determining the phase angle of the impedance device.

4. In a testing apparatus, means for measuring the phase angle of an impedance device, and means for correcting the measurement for the resistive component of said device comprising a resistance element having a temperature coefficient of resistance, and manually controlled means for varying the temperature of said element to adjust the resistance.

5. In a testing apparatus, a bridge circuit including a pair of electrically balanced arms, an arm having a standard impedance element therein, and an arm for receiving an impedance element to be measured, a resistance element having a temperature coefficient of resistance in one of the impedance arms, a bulb enclosing said resistance element, an incandescent heating element for radiating heat to the resistance element, and a control circuit for said incandescent element, including manually controlled means for varying the temperature thereof.

6. In an electrical measuring apparatus, a circuit for receiving a device, an electrical characteristic of which is to be measured, means for supplying current to said circuit, a resistance in said circuit having resistance varying with temperature and manually controlled means for varying the temperature of said resistance.

FRANK G. TABORSKY.